(12) United States Patent
Gabrielson et al.

(10) Patent No.: US 6,861,099 B2
(45) Date of Patent: Mar. 1, 2005

(54) AMMONIUM HYDROXIDE SCAVENGED BINDER FOR LOW TMA FIBERGLASS INSULATION PRODUCTS

(75) Inventors: Kurt D. Gabrielson, Liburn, GA (US);
Kim Tutin, Stone Mountain, GA (US);
Carl R. White, Conyers, GA (US);
David J. Bir, Conyers, GA (US)

(73) Assignee: Georgia-Pacific Resins, Inc., Atlanta, GA (US)

( * ) Notice: Subject to any disclaimer, the term of this patent is extended or adjusted under 35 U.S.C. 154(b) by 240 days.

(21) Appl. No.: 10/227,529

(22) Filed: Aug. 26, 2002

(65) Prior Publication Data

US 2004/0039093 A1 Feb. 26, 2004

(51) Int. Cl.[7] ................................................. B05D 3/00
(52) U.S. Cl. ................................................... 427/389.8
(58) Field of Search ..................................... 427/389.8

(56) References Cited

U.S. PATENT DOCUMENTS

| | | |
|---|---|---|
| 3,223,668 A | 12/1965 | Stalego |
| 3,616,179 A | 10/1971 | McCombs et al. |
| 3,617,428 A | 11/1971 | Carlson |
| 3,819,441 A | 6/1974 | Fargo et al. |
| 3,935,139 A | 1/1976 | Ashall |
| 3,956,204 A | 5/1976 | Higginbottom |
| 3,956,205 A | 5/1976 | Higginbottom |
| 4,028,367 A | 6/1977 | Higginbottom |
| 4,060,504 A | 11/1977 | Higginbottom |
| 4,095,010 A | 6/1978 | Zellar et al. |
| 4,176,105 A | 11/1979 | Miedaner |
| 4,373,062 A | 2/1983 | Brown |
| 4,376,807 A | 3/1983 | Cannon et al. |
| 4,433,120 A | 2/1984 | Chiu |
| 4,525,492 A | 6/1985 | Rastall et al. |
| 4,650,825 A | 3/1987 | Jellinek et al. |
| 4,663,419 A * | 5/1987 | Fugier et al. ............... 528/164 |
| 4,757,108 A | 7/1988 | Walisser |
| 4,960,826 A | 10/1990 | Walisser |
| 5,011,886 A | 4/1991 | Buschfeld et al. |
| 5,296,584 A | 3/1994 | Walisser |
| 5,324,337 A | 6/1994 | Heilbing |
| 5,358,748 A * | 10/1994 | Mathews et al. ......... 427/389.8 |
| 5,368,803 A | 11/1994 | Brow et al. |
| 5,371,140 A | 12/1994 | Parks |
| 5,505,998 A | 4/1996 | Mathews et al. |
| 5,534,612 A | 7/1996 | Taylor et al. |
| 5,538,761 A | 7/1996 | Taylor |
| 5,578,371 A | 11/1996 | Taylor et al. |
| 5,612,405 A | 3/1997 | Bainbridge et al. |
| 5,623,032 A | 4/1997 | Wu |
| 5,684,118 A | 11/1997 | Breyer et al. |
| 5,691,426 A * | 11/1997 | Floyd ........................ 525/491 |
| 5,708,121 A | 1/1998 | Parks et al. |
| 5,719,228 A | 2/1998 | Taylor et al. |
| 5,795,934 A | 8/1998 | Parks |
| 5,864,003 A | 1/1999 | Qureshi et al. |
| 5,916,966 A * | 6/1999 | Walisser ..................... 524/594 |
| 5,952,440 A | 9/1999 | Walisser et al. |
| 6,077,883 A | 6/2000 | Taylor et al. |
| 6,090,883 A | 7/2000 | Fouquay et al. |
| 6,114,491 A | 9/2000 | Dupre et al. |
| 6,194,512 B1 | 2/2001 | Chen et al. |
| 6,395,819 B1 * | 5/2002 | Espiard et al. ............... 524/492 |
| 6,706,809 B2 | 3/2004 | Tutin et al. |

FOREIGN PATENT DOCUMENTS

| | | |
|---|---|---|
| EP | 0699639 | 3/1996 |
| WO | WO 94/18187 A1 | 7/1994 |
| WO | 03/046036 | 6/2003 |

* cited by examiner

*Primary Examiner*—Erma Cameron
(74) *Attorney, Agent, or Firm*—Banner & Witcoff, Ltd.

(57) ABSTRACT

A phenol-formaldehyde resole resin is combined with an ammonia-based formaldehyde scavenger to produce a product useful, for example, as a binder used in the production of glass fiber insulation products. The starting resin may have a free formaldehyde content of 1.5 to 14 wt. %, based on a total weight of the resin, and the resin and scavenger may be combined at a molar ratio in the range of 0.1 to 5. The resulting binder may have a free formaldehyde content of 1 wt. % or less, based on a total weight of the reaction product. This binder may then be applied to a glass fiber base material in a conventional manner.

36 Claims, 2 Drawing Sheets

AMMONIUM HYDROXIDE SCAVENGED BINDER FOR LOW TMA FIBERGLASS INSULATION PRODUCTS

FIELD OF THE INVENTION

This invention relates to water soluble, low molecular weight binders produced from phenol-formaldehyde resole resins that may be useful, for example, in the production of fiberglass products. This invention also relates to methods for making the binders and fiberglass products. These products and methods may be used in the manufacture of low odor fiberglass products useful for insulation, including, but not limited to, insulation used in automobile headliners and room dividers. Cured, bonded fiberglass products produced using binders according to this invention are low odor because the binders release very low levels of trimethylamine (TMA).

BACKGROUND

The use of fiberglass to produce insulation products, such as automobile headliners and room dividers, is known. In general, a binder is prepared from a suitable material, such as phenol-formaldehyde resole resins, and this binder is applied to a glass fiber base material. The binder-coated base material later can be shaped, sized as desired, and cured to maintain the base material in this final, desired shape.

Many patents and other documents describe general fiberglass production processes. U.S. Pat. No. 5,952,440 contains a detailed description of the history and the state of the art relating to this type of fiberglass technology. This patent is entirely incorporated herein by reference.

In general, phenol-formaldehyde resole resins have been used in preparing binders for fiberglass insulation products. These resins have a disadvantage, however, in that they generally contain a large amount of free formaldehyde, which must be eliminated prior to applying the binder to the fiberglass product. Formaldehyde scavengers typically are used to remove this free formaldehyde from a phenol-formaldehyde resole resin.

Urea is one commonly used formaldehyde scavenger. While urea is relatively inexpensive as compared to some other formaldehyde scavengers, its use as a scavenger is not ideal in producing at least some fiberglass insulation products. When urea reacts with formaldehyde, a formaldehyde-amine species is formed. When this species breaks down (e.g., thermal breakdown), trimethylamine (TMA) is produced and released from the finished fiberglass product. TMA has a distinctive and unpleasant odor (a "fishy" odor), and therefore, its formation should be avoided in at least some fiberglass products.

In order to minimize odors generated from use of urea as a formaldehyde scavenger, fiberglass producers have generally taken two approaches. First, they allow the phenol-formaldehyde resole resin reaction procedure to proceed until there is a very low free formaldehyde content in the resin product, which minimizes the amount of scavenger needed to react with the remaining free formaldehyde. Second, they add more thermally stable formaldehyde scavengers (such as melamine) to the binder in an effort to minimize TMA production during binder cure.

U.S. Pat. No. 5,952,440 describes a system that attempts to take advantage of both of these possible "cures." Specifically, when producing the resole resin in the system described in U.S. Pat. No. 5,952,440, the phenol-formaldehyde reaction is allowed to proceed until the free formaldehyde content in the resin is in the range of 0.5% to 2.5%, by weight (based on a total weight of the resin), and preferably between 0.7 and 2% by weight, and most advantageously between 0.8 and 1.2% by weight. Then, melamine is added to the resin to react with the remaining free formaldehyde (melamine acts as a formaldehyde "scavenger").

These "cures," however, are not without their own associated drawbacks and disadvantages. For example, allowing the resole resin to react for a sufficient time to reach a very low free formaldehyde content will result in a resin product having a higher molecular weight (the resin is said to be more "advanced"). High molecular weight phenol-formaldehyde resole resins tend to be sticky, which causes the binder and the binder-coated fiberglass product to stick to the production equipment, particularly in the fiberglass forming chamber. Additionally, higher molecular weight phenol-formaldehyde resole resins tend to have a higher tetradimer content. "Tetradimer" is a phenol-formaldehyde dimer present in all phenolic resoles. This dimer is very crystalline and precipitates readily, especially when the free formaldehyde of the resin has been scavenged, for example, by melamine or urea. Tetradimer precipitation has long been recognized in the industry as a problem that can result, for example, in plugged spray nozzles and in precipitate formation in the resin, premix, and binder storage tanks. This precipitate must be removed and discarded, which increases production expenses and decreases binder efficiency.

Use of a large amount of melamine as a formaldehyde scavenger, as described in U.S. Pat. No. 5,952,440, also can lead to precipitation problems. U.S. Pat. No. 5,952,440 describes use of melamine such that the molar ratio of free formaldehyde to melamine is 0.5 to 1.5. Melamine is known to have limited water solubility. Therefore, it may be necessary to filter out excess, undissolved melamine, as described in U.S. Pat. No. 5,952,440. This is an expensive and time-consuming additional step. Moreover, when used as a formaldehyde scavenger, melamine reacts with formaldehyde to form methylolated melamine species, which have been shown to be unstable. This methylolated melamine can form an undesirable white precipitate when the resin is allowed to age. Additionally, melamine is fairly expensive, which increases the cost of the resulting fiberglass products.

U.S. Pat. No. 3,819,441 describes a process for making glass fiber products using phenolic binder resins that are condensed to an advanced stage such that the condensate is water-insoluble at a pH of 7.5. The condensate is solubilized by adding a small amount of a non-ionic or anionic agent (such as coconut fatty acid amine). During production of the binder in the process described in this patent, melamine and a large relative amount of urea are added to the binder mixture. This patent is entirely incorporated herein by reference. Because of its relatively high urea content, it is expected that this material would produce a significantly unpleasant odor.

Several U.S. patents describe use of an acidic binder where the formaldehyde is scavenged with melamine to produce a low odor/low TMA emission fiberglass product. See, for example, U.S. Pat. Nos. 5,296,584, 5,358,748, 5,368,803, and 5,505,998, which patents are entirely incorporated herein by reference. Such acidic binders, however, are very corrosive. Fiberglass plants that use such binders must have stainless steel equipment at any place that has direct contact with the binder. Stainless steel has not traditionally been used in fiberglass plants. Therefore, use of these patented systems may require that the plants "retrofit" with stainless steel, at considerable cost in both money and down time. Additionally, acidic binders are relatively unstable and tend to lose their water dilutability rather quickly. This can produce precipitates in the binder material and require that the binder be filtered and/or discarded.

Other known resin/binder systems are emulsifiable rather than water soluble. Emulsifiable systems, however, are more difficult for fiberglass manufacturers to handle because if the emulsion breaks, high molecular weight resin will coat the equipment. Additionally, emulsifiable resins and binders typically have a higher molecular weight than their water-soluble counterparts. Therefore, even if the emulsions remain stable and do not break, sticking problems can result, as generally described above.

The present invention has been developed to address various disadvantages and problems known in this art. This invention relates to water soluble, low molecular weight products (e.g., phenol-formaldehyde resin-containing binders) that can be used, for example, in the production of fiberglass products, as well as to methods for making the binders and fiberglass products. These products and methods also may be used, for example, in making low odor fiberglass products.

SUMMARY

In general, this invention relates to various methods used in making reaction products and the products produced by the methods. As one example, a method according to the invention includes: (a) combining a phenol-formaldehyde resole resin and an ammonia-based formaldehyde scavenger, and (b) reacting free formaldehyde in the resin and the scavenger to thereby form a formaldehyde-scavenged product. In this exemplary process, the starting resole resin has a free formaldehyde content of 1.5 to 14%, by weight, based on a total weight of the resin, and the formaldehyde-scavenged product has a free formaldehyde content of 1% or less, by weight, based on a total weight of the formaldehyde-scavenged product. In the process according to this example of the invention, the resole resin and the scavenger are combined in amounts such that a molar ratio of the free formaldehyde to ammonia from the ammonia-based formaldehyde scavenger is in a range of 0.1 to 5, and in some examples, this molar ratio may be in the range of 0.5 to 2. A molar ratio of 1.5 is used in some specific examples of the invention. Also, in some examples of the invention, the phenol-formaldehyde resole resin starting material may have a weight average molecular weight of 800 or less, or even 450 or less.

Various ammonia-based formaldehyde scavengers can be used in processes according to the invention. For example, the ammonia-based formaldehyde scavenger may be added to the reaction in the form of anhydrous ammonia, aqueous ammonium hydroxide, or both. If added in the form of an aqueous solution (e.g., aqueous ammonium hydroxide), the ammonia-based formaldehyde scavenger can also function as a source of water for producing a final liquid binder solution.

Additionally, processes according to the invention can, if desired, include the use of a latent acid catalyst during production of the reaction products. In this instance, the latent acid catalyst can be combined with the other reactants at any appropriate time in the reaction procedure. Any suitable latent acid catalyst can be used without departing from the invention. In some examples, the latent acid catalyst includes an ammonium salt of an acid having a pH value of 2 or less. More specific examples of suitable latent acid catalysts include an ammonium salt of sulfuric acid, an ammonium salt of oxalic acid, and an ammonium salt of a sulfonic acid.

As an additional step used in some examples of methods according to the invention, the reaction product is applied to a glass fiber base material.

One feature of methods according to the invention, as noted above, includes the use of ammonia-based formaldehyde scavengers. The use of such scavengers can reduce or eliminate the need for other known scavengers, such as urea and melamine, and thus use of the ammonia-based scavengers can reduce or eliminate the disadvantages associated with the use of melamine and/or urea scavengers (e.g., TMA production, thermal breakdown, precipitate production, tetradimer production, etc.). In some examples of the invention, the starting resin, the binder reaction mixture, and the formaldehyde-scavenged product contain 10 wt. % urea or less, or even 5 wt. % urea or less, based on the total weight of the starting resin, the reaction mixture, or formaldehyde-scavenged product (as the case may be). Similarly, the starting resin, the binder reaction mixture, and the formaldehyde-scavenged product may contain 10 wt. % melamine or less, or even 5 wt. % or less, based on the total weight of the starting resin, the reaction mixture, or formaldehyde-scavenged product (as the case may be). In some examples according to the invention, the starting resin, the reaction mixture, and the formaldehyde-scavenged product will contain no or substantially no urea or melamine. As used in this specification, the term "substantially no" urea or melamine means 1% urea or melamine or less, by weight, based on a total weight of the material being measured (as stated or as evident from the context).

As noted above, some examples of methods according to the invention relate to methods for preparing glass fiber products. Such methods may include: (a) preparing a binder including a phenol-formaldehyde resole resin and an ammonia-based formaldehyde scavenger; and (b) applying the binder to a glass fiber base material to thereby produce a glass fiber product. The ammonia-based formaldehyde scavengers may be, for example, the same as those described above. In some examples of these methods according to the invention, the preparing and applying steps may occur in an "in-line" manner, with the preparing step taking place upstream from the applying step. In other examples, the preparing step will occur less than one hour before the applying step, and in some instances, less than 15 minutes or even 5 minutes before the applying step.

Processes according to some examples of this invention may use a phenol-formaldehyde resole resin starting material that has a free formaldehyde content of 1.5 to 14%, by weight, based on a total weight of the resin, and the final binder may have a free formaldehyde content of 1% or less, by weight, based on a total weight of the binder. Also, in processes according to some examples of the invention, the resin and the scavenger may be mixed in amounts such that a molar ratio of the free formaldehyde to ammonia from the ammonia-based formaldehyde scavenger is in a range of 0.1 to 5, and preferably 0.5 to 2. A molar ratio of 1.5 may be used in certain specific examples of the invention. Like the processes described above, latent acid catalysts may be used, if desired, in preparing the binder in processes according to this example of the invention.

Processes for making glass fiber products according to some examples of the invention also may include conventional binder drying and curing steps, as well as the addition of other common binder ingredients (e.g., silanes, lignins, dedusting oils, carbon black, etc.). Similarly, the glass fiber base material or glass fiber product may be cut, sized, shaped, molded, and the like, in any conventional manner, without departing from the invention.

This invention also relates to the reaction products and glass fiber products prepared by the various methods described above. Examples of products according to the invention include low odor glass fiber products and binders for making them that may be water soluble and have a low molecular weight. Additionally, the glass fiber products according to examples of the invention may release very low levels of trimethylamine, e.g., 25 ppm trimethylamine or less when cured for 1 minute at 525° F. and/or 10 ppm trimethylamine or less when cured for 10 minutes at 450° F.

BRIEF DESCRIPTION OF THE DRAWINGS

The foregoing Summary, as well as the following Detailed Description, will be better understood when read in conjunction with the accompanying drawings, which are included by way of example, and not by way of limitation with regard to the claimed invention.

DETAILED DESCRIPTION

Figure 1:
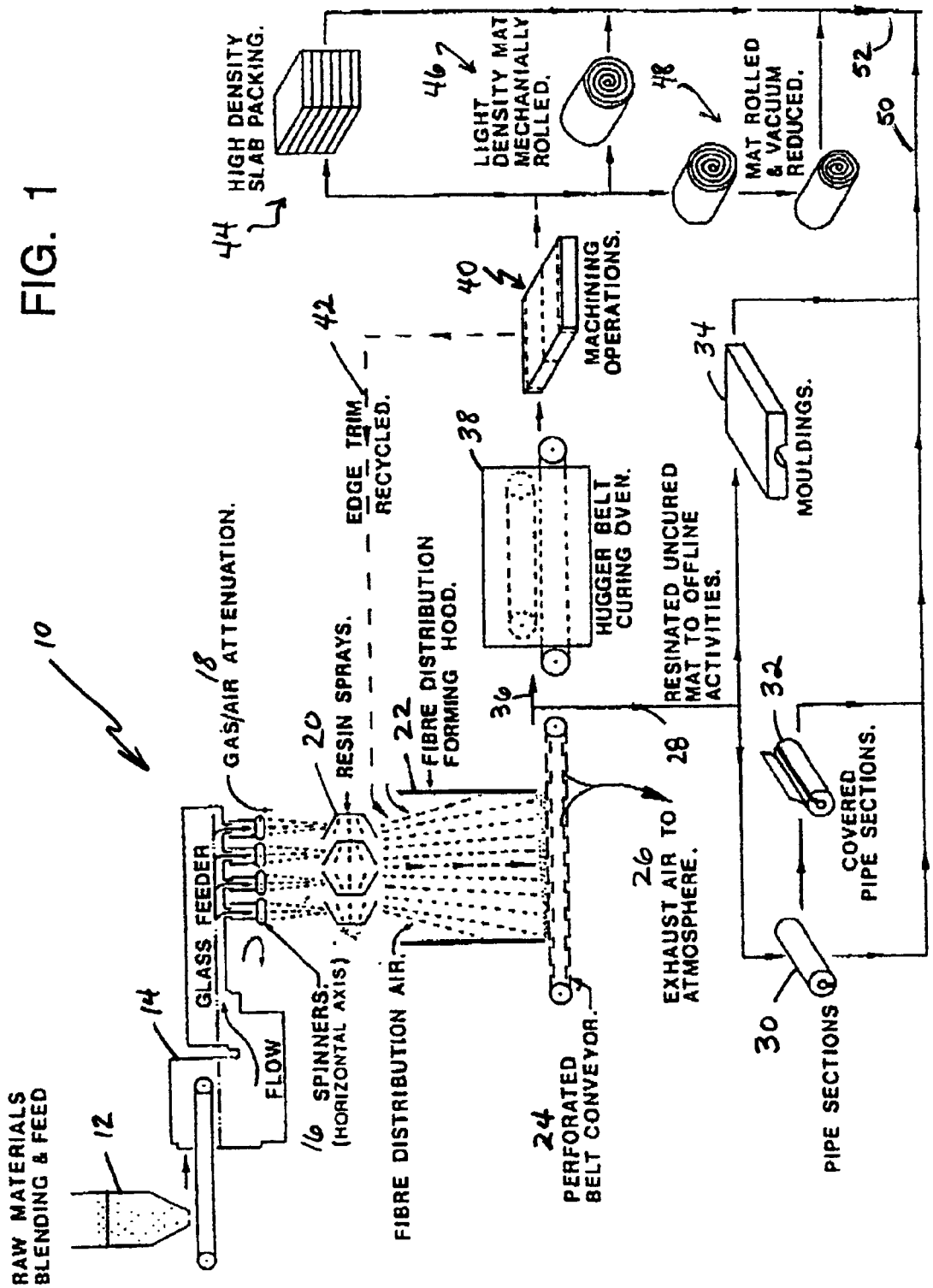
FIG. 1 illustrates a schematic diagram of equipment used in practicing one example of a method according to the invention.

As described above, this invention relates to water soluble, low molecular weight products (e.g., phenol-formaldehyde resole resin-containing binders) that can be used, for example, in the production of low odor fiberglass products, such as fiberglass insulation (e.g., for automobile headliners or room dividers). The following provides a general overview of various exemplary embodiments of the invention. After this general overview, the specification includes detailed examples that illustrate examples of products and processes according to the invention in more detail.

Binders and fiberglass insulation products according to some examples of the invention generally may be prepared as follows. First, a low molecular weight phenol-formaldehyde resole resin material is produced. This resole resin is used as a starting material to produce a binder by mixing the resin with an ammonia-based formaldehyde scavenger, such as anhydrous ammonia or ammonium hydroxide. The binder optionally may contain a latent acid catalyst, such as an ammonium salt of a strong acid, as well as additional water and other conventional binder ingredients.

Once produced, the binder can be applied to a glass fiber base material (e.g., by spraying). After the binder is dried on the glass fiber base material, the resulting fiberglass product can be stored for an extended time period (e.g., several hours to two months or more), after which time the product can be sized and/or shaped into a desired final configuration (if necessary) and the binder cured. If desired, sizing and/or shaping can occur at any time, e.g., before, during, and/or after the storage and/or drying and/or curing steps.

The following describes various aspects of exemplary production processes according to the invention in more detail.

I. The Phenol-Formaldehyde Resole Resin

Phenol-formaldehyde resole resins for use in producing binders and reaction products according to this invention may be prepared in any suitable manner known in the art. For example, they may be prepared by reacting phenol and formaldehyde in water in the presence of a basic catalyst. Examples of suitable basic catalysts include one or more members selected from the group consisting of: oxides of alkali metals, hydroxides of alkali metals, oxides of alkaline earth metals, hydroxides of alkaline earth metals, and tertiary amines. Specific examples of suitable basic catalysts include: sodium hydroxide, potassium hydroxide, calcium hydroxide, and trimethylamine. The basic catalyst may be present in any suitable amount, provided that the desired phenol/formaldehyde reaction process proceeds in a suitable manner. For example, the molar ratio of catalyst to phenol in the reaction mixture may be in the range of 0.01 to 1.0, and preferably 0.05 to 0.25.

This initial phenol-formaldehyde methylolation/condensation step can proceed at any suitable reaction temperature over any suitable reaction time period. For example, the temperature may be in the range from 50–70° C., and preferably 55–65° C., and the reaction generally is allowed to proceed until the free formaldehyde content is in the desired range. As an example, this reaction can be allowed to proceed for a sufficient time such that the free formaldehyde content in the resole resin reaction product is greater than 1.0% by weight (based on the weight of the reaction mixture), and preferably within the range of 1.5 to 14% by weight. In some examples of the invention, the free formaldehyde content of the resole resin reaction product may be in a range of 3% to 14% by weight, or even 4.5 to 14% by weight (based on the weight of the resole resin reaction product). The molar ratio of formaldehyde to phenol in this initial reaction step also can vary widely, provided a suitable phenol-formaldehyde resole resin product is produced. In order to avoid the presence of a great excess of free formaldehyde and/or free phenol, preferably the molar ratio of formaldehyde to phenol in the initial reaction mixture is in the range of 1.5–5, with the range of 2.2–4.5 being preferred.

The resole resins used as starting materials according to some examples of this invention may be modified to include an organic acid. This can be accomplished at any suitable time in the resole resin reaction procedure. Suitable organic acids include, as examples, carboxylic acids, diacids, phenolic acids, amino acids, and their precursors. Specific, non-limiting examples of suitable acids or their precursors include citric acid, maleic acid, tannic acid, lactic acid, or their precursors (e.g., maleic anhydride). Any suitable amount of the organic acid or precursor can be used without departing from the invention (e.g., 0.1 to 15% by weight, preferably 0.1 to 10%, based on the weight of the phenol-formaldehyde reaction mixture).

Modifying the resoles with an organic acid can increase the stability of the resins, for example, by significantly minimizing tetradimer precipitation problems. Thus, inclusion of an organic acid, such as maleic acid (or their precursors, such as maleic anhydride), in the resole resin can reduce and/or eliminate the disadvantages associated with tetradimer formation. Moreover, inclusion of organic acids does not contribute to TMA odors and may increase binder cure speed.

The final properties of resins useful in processes according to the invention also can vary widely, depending at least in part on the processes and materials used in making them. For example, the pH of the resin may be in the range of 7.0 to 10, and preferably within the range of 8 to 9. The free phenol content of the final resin product may be less than 5% by weight, based on the total weight of the resin product, and preferably less than 3%. Also, the resins may include, for example, 30–70% non-volatiles, and preferably 40–60%, based on the total weight of the resin. The final resin product used according to at least some examples of the invention will have a tetradimer content of less than 25% by weight, based on a total weight of the resole resin, and preferably, less than 20% by weight.

As mentioned above, resins used in some examples of the invention may have a relatively low molecular weight. The GPC (gel permeation chromatography) molecular weight numbers of resins used in some examples of this invention may fall within the following ranges:

| | GPC Numbers | |
|---|---|---|
| Molecular Wt. | General | Preferred |
| Mn | <600 | <350 |
| Mw | <800 | <450 |
| Mz | <1000 | <550 |

By using low molecular weight resins, the resulting binders tend to be less sticky and have a lower tetradimer content. These features make the resins and binders easier to handle.

II. The Binder

Binders according to examples of the invention may be prepared by mixing a phenol-formaldehyde resole resin, such as those described above, with an ammonia-based formaldehyde scavenger (e.g., anhydrous ammonia, ammonium hydroxide, etc.), and optionally water (at least some of the water may be added as part of an aqueous ammonia-based formaldehyde scavenger). Suitable ammonia-based formaldehyde scavengers include anhydrous ammonia and aqueous solutions of ammonium hydroxide (at any desired concentration).

Any suitable amount of ammonia-based formaldehyde scavenger can be used in accordance with the invention, provided the desired degree of formaldehyde scavenging occurs. In some examples of the invention, the molar ratio of free formaldehyde in the resin to ammonia available from the ammonia-based formaldehyde scavenger will be in the range of 0.1 to 5, and preferably in the range of 0.5 to 2. In some examples of the invention, it is desirable to formulate the binder such that six moles of free formaldehyde (from the resole resin) reacts with four moles of ammonia (from the scavenger) (i.e., a 1.5 molar ratio of formaldehyde to ammonia) to thereby form hexamethylenetetraamine through the following reaction:

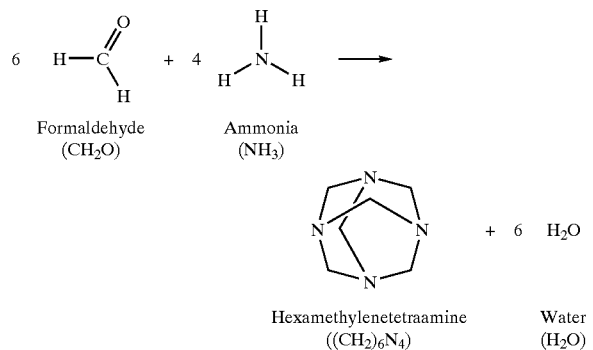

One advantage of using the ammonia-based formaldehyde scavengers in accordance with the invention lies in the fact that ammonia reacts substantially instantaneously with formaldehyde. For this reason, when using the ammonia-based formaldehyde scavengers, one does not need to produce "pre-reaction mixtures" or "premixes," as are conventionally used prior to making binders with urea-based and/or melamine-based formaldehyde scavengers. For example, when using urea to scavenge free formaldehyde in a phenolic resole, a "premix" typically is prepared in advance. This "premix" is a solution of the phenolic resole and urea, which generally reacts for 8–16 hours prior to binder preparation. Also, when using urea, the free formaldehyde content is driven downward (e.g., to less than 0.5 wt. %), which can cause the tetradimer in the resin to precipitate. When it precipitates, it must be filtered out of the binder, which increases costs and time associated with use of urea scavenged binder. Additionally, the tetradimer precipitates can cause the binder nozzles to plug, as described above.

Likewise, when using melamine to scavenge free formaldehyde, a "pre-reaction mixture" of the resole resin, water, and melamine typically is heated to dissolve the melamine, because melamine has limited water solubility at room temperature. The need to produce these "pre-reaction mixtures" increases the time, cost, and inefficiency of this process.

Additionally, urea and melamine based "pre-reaction mixtures" or "premixes" generally have a rather limited shelf life. Once a resin has been "pre-reacted," it generally must be used within a relatively short time period (preferably 12–24 hours). After this time period, the premixes tend to start losing water dilutability and may begin to precipitate. This may result in undesired discard of the premix, which results in waste and increased costs.

Because ammonia reacts quickly with formaldehyde, there is no need for "pre-reaction mixtures" when using ammonia-based formaldehyde scavengers according to the invention. The ammonia-based scavenger may be mixed with the resin very shortly before the resulting binder is applied to the glass fiber base material. For example, the ammonia-based scavenger and resin may be mixed and reacted (to scavenge the free formaldehyde) less than one hour, or even less than 15 minutes or less than 5 minutes, before the resulting binder is applied to a glass fiber base material. As another example, the scavenger and resin may be mixed in an "in-line" manner (e.g., using in-line or static mixers), to thereby scavenge the free formaldehyde and prepare the binder as the binder ingredients are being transported to the device for applying the binder to the glass fiber base material. In this manner, the above described disadvantages, delays, and inefficiencies can be avoided.

The reaction mixture produced in preparing the binder optionally also may include a latent acid catalyst. Suitable latent acid catalysts include ammonium salts of strong acids, e.g., acids having a pH value of 2 or less. Specific examples of suitable latent acid catalysts include at least one member selected from the group consisting of an ammonium salt of sulfuric acid, an ammonium salt of oxalic acid, and an ammonium salt of various sulfonic acids, such as methanesulfonic acid, toluenesulfonic acid, and phenolsulfonic acid. Ammonium sulfate and the various latent acid components described in U.S. Pat. No. 5,952,440 are suitable for use in producing at least some binders of the invention.

The amount of latent acid catalyst used, if desired, may vary widely. For example, the molar ratio of latent acid catalyst in the binder to unneutralized base catalyst in the initial resin may be in the range of 0.5 to 2.5, and preferably in the range of 0.5 to 1.5. Also, the binder may contain latent acid catalyst (such as ammonium sulfate) in an amount of 1–25 wt. %, preferably 2–20 wt. %, based on the weight of the binder solids.

In general, it is desirable to minimize the amount of latent acid catalyst used in the procedure, while still allowing the reaction to proceed in a suitable manner. This is because the latent acid catalysts generally are expensive, and large amounts of latent acid catalyst may increase the moisture adsorption characteristics of the finished fiberglass products. Additionally, ammonium based latent acid catalysts decrease the binder pH by releasing ammonia when the binder is cured. The higher the latent acid catalyst content, the higher the ammonia emissions. Reducing such emissions is desirable for operator health and general environmental reasons. In general, modifying the resins with an organic acid (such as maleic acid) or its precursor (such as maleic anhydride), as described above, can help reduce the amount of latent acid catalyst used in the binder production process.

The use of latent acid catalysts in binder systems according to the invention may make these binder systems advantageous over various known binders. Several known binders are acidic. An acidic binder is very corrosive. In order to handle this type of binder, fiberglass insulation manufacturers must use stainless steel for any equipment that directly contacts the binder. Stainless steel has not traditionally been used in fiberglass plants; therefore, plants that desire to use acidic binders must be retrofit with stainless steel equipment. Such fitting can be expensive and time consuming. In contrast, binders according to this invention that use the latent acid catalysts are mildly alkaline. This feature minimizes the binder's corrosivity and eliminates the need to use stainless steel for all equipment that contacts the binder.

Additionally, acidic binders typically are much less stable than alkaline binders. For example, acidic binders tend to lose their water dilutability and precipitate more readily as compared to the latent acid catalyzed alkaline binders of the invention.

If desired, it is not necessary to use any latent acid catalyst while producing binders according to the invention. In this event, the binder may be prepared using water, an ammonia-containing formaldehyde scavenger, the resole resin, and optionally other suitable or desired binder ingredients. The resulting binder is more basic than it would be if prepared in a process including a latent acid catalyst.

Binders according to the invention may include other suitable ingredients, such as those typically found in fiberglass binder systems. Examples of other suitable ingredients include silane, lignin, dedusting oils, carbon black, urea-formaldehyde resins, etc. These ingredients can be readily incorporated into binder systems according to the invention, in suitable amounts, by the skilled artisan through the exercise of routine experimentation. While they may be included in some examples of binders according to the invention, in many instances the binders will contain no or substantially no latex or fatty acid amine ingredients ("substantially no" meaning less than 1% by weight, based on a total weight of the binder).

Notably, in producing binders according to some examples of the invention, it is not necessary that the initial resole resin material include any formaldehyde scavengers, such as melamine, urea, dicyandiamide, or guanidine, although such scavengers may be included, if desired. If any such scavengers are included in the resole resin or binder (such as urea or melamine), they are generally present in an amount of 15 wt. % or less, and preferably 5 wt. % or less, based on the total weight of the resole resin or binder (as the case may be). In many instances, the starting resole resins and binders according to the invention will contain none of these scavengers or substantially none of these scavengers (less than 1% by weight).

Some advantages of exemplary binders according to the invention relate to their water solubility and low molecular weight. The resins and binders used according to the invention may be completely water soluble, which makes them easier for fiberglass manufacturers to handle. This constitutes a significant advantage, for example, over emulsifiable systems. As described above, when the emulsion breaks in emulsifiable systems, the high molecular weight resin tends to coat or stick to the fiberglass production equipment. Also, because emulsifiable resins tend to have a higher molecular weight, they tend to be sticky even when the emulsion remains stable. Thus, the ability to use water soluble and low molecular weight resins and binders in some examples according to the invention constitutes a significant advantage.

The final binder compositions according to the invention may possess a wide variety of physical and chemical properties. For example, some binders according to the invention may have an amber color. Also, binders according to the invention may have a free formaldehyde content of 1 wt. % or less and a free phenol content of 5 wt. % or less, based on the total weight of the binder. Additionally, some binders may have a pH in the range of 7 to 10, and preferably within the range of 8 to 9. Binders according to the invention also may have 1–50 wt. % non-volatiles, and preferably 5–25 wt. % non-volatiles, based on the total weight of the binder. The water dilutability of some examples of binders according to the invention may be 50:1 or higher.

III. The Fiberglass Products

The binders according to at least some examples of the invention may be used in the production of fiberglass products in any suitable manner known in the art. Typically, the binder is applied to the glass fiber (e.g., by spraying, impregnating, etc.) as the fibers are being prepared, as in the manner described in U.S. Pat. No. 5,952,440.

Any suitable procedure for applying the binder to the glass fiber base material can be used in processes according to the invention. For example, the binder can be prepared in a batch process, optionally stored for a period of time, and then applied to the glass fibers by spraying as the fibers are being prepared.

However, as described above, one advantage of using the ammonia-based formaldehyde scavengers in some processes according to the invention relates to the elimination of "pre-reaction mixtures" or "premixes." This allows the binder producer to prepare the binder by mixing all binder ingredients as needed using an "in-line" mixing technique. The term "in-line mixing," as used in this application, means a non-batch, continuous or partially continuous process for mixing the binder ingredients, producing the binder, and applying the binder to a glass fiber base material.

FIG. 1 schematically illustrates one example of a glass fiber production system 10 that can be used in accordance with the invention. In this illustrated example, the raw materials for glass fiber formation are blended in a blender 12 and fed from there into a glass fiber production system 14. The blended glass fiber raw materials are fed to a spinner system 16 and extruded through openings while air and/or other gases (gas/air attenuation 18) are blown onto the fibers. This process forms a glass fiber base material, and such systems are conventional and known to those skilled in the art.

After the glass fiber formation, a binder material is sprayed onto the glass fibers (sprayer 20), and the binder coated glass fibers are passed through a fiber distribution forming hood 22 for collection on a perforated conveyor belt 24. Gas and/or air blowing on the coated fibers in the fiber distribution forming hood 22 and on the conveyor belt 24 help dry the binder on the fibers and bind fibers together to form a glass fiber mat. The moving air or gas is exhausted to atmosphere via exhaust system 26 (if necessary, after appropriate filtering or other treatment).

After leaving the fiber distribution forming hood 22, the binder-coated (or "resinated") uncured glass fiber mat may be moved to various offline production steps or systems, as illustrated by path 28 in FIG. 1. For example, prior to curing, the glass fiber mat may be formed into pipe sections (covered 30 or uncovered 32), or otherwise molded into a desired shape 34. Curing of the binder (if necessary) can take place after the offline activities illustrated downstream from path 28 or along with the various shaping steps.

As another alternative, after leaving the fiber distribution forming hood 22, the binder-coated uncured glass fiber mat material may be moved along path 36 to a curing device 38. While a hugger belt type curing oven 38 is illustrated as an example in FIG. 1, curing also may take place in a mold or in any other appropriate curing device, without departing from the invention. After curing, the glass fiber mat may be further processed in any appropriate manner. For example, as illustrated in FIG. 1, various machining operations may take place at machining station 40, such as cutting, trimming, etc., and excess or non-used glass fibers (e.g., from a cutting or trimming operation) may be recycled back to the fiber distribution forming hood 22 along recycle line 42. Further processing may include glass fiber mat slab stacking 44 (e.g., for high density glass fiber products), mechanical rolling 46 (e.g., for low density glass fiber products), or rolling and vacuum reducing 48.

After processing, the uncured and/or cured glass fiber materials may be moved to an appropriate location for storage, shipment, or other use, as generally illustrated by paths 50 and 52.

In the example illustrated in FIG. 1, the binder material may be supplied to the application device 20 in a fully prepared form. For example, prior to delivering the binder to the spray application device 20, a starting phenol-formaldehyde resole resin and an ammonia-based formaldehyde scavenger may be introduced, either continuously or periodically, into a mixing tank. Of course, any other desired binder ingredients also may be introduced into the tank. Through mixing in the tank, the binder product is produced. An outlet of the mixing tank may be in fluid communication with the spray application device 20 such that as the binder exits its mixing tank, it is applied to the glass fibers in a suitable manner, such as through spray nozzles. Application of the binder to the glass fibers may take place continuously or on a periodic basis without departing from the invention. As another alternative, binder can be produced and introduced (continuously, semi-continuously, or batchwise) into a supply tank or system that supplies binder to sprayer 20 (supply tank or system not shown).

Figure 2:
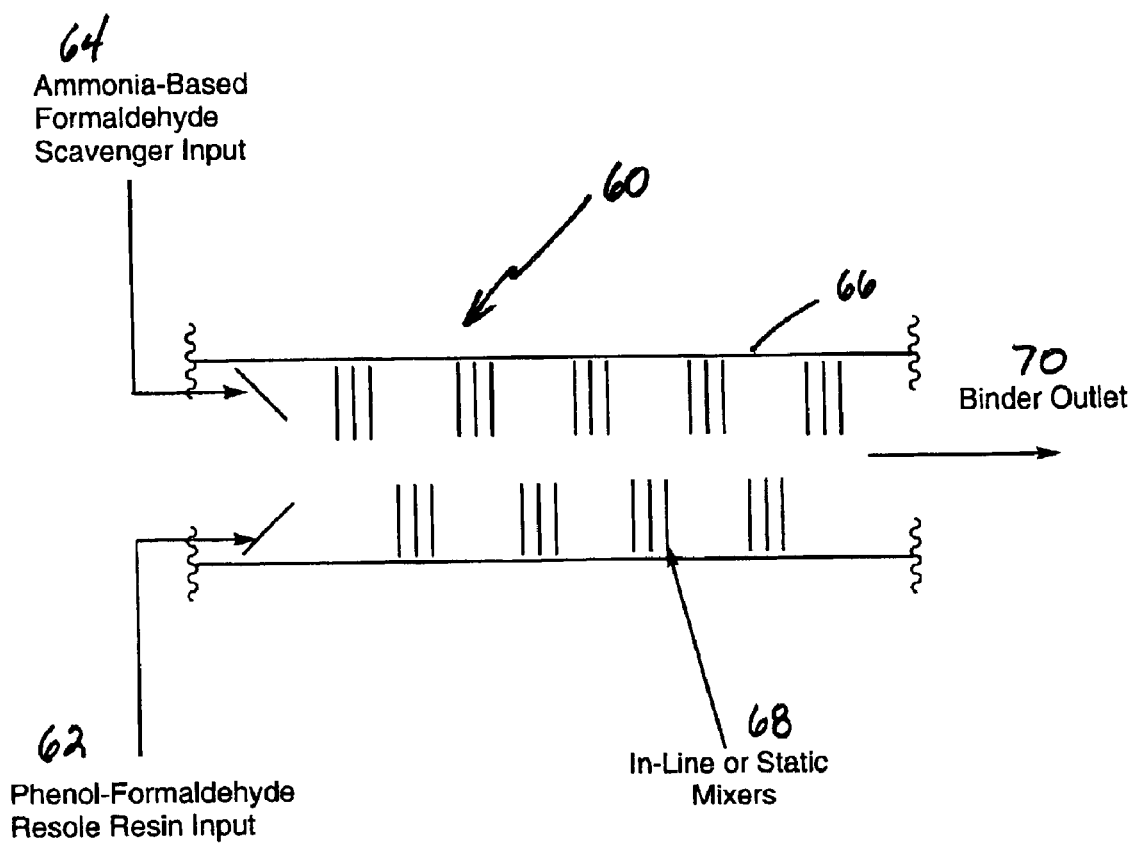
FIG. 2 illustrates a schematic diagram of equipment used in mixing the resin and scavenger in one example of an "in-line" method according to the invention.

FIG. 2 schematically illustrates an example of an "in-line" binder production and application system 60 that can be used, for example, with the system illustrated in FIG. 1. In the system 60 of FIG. 2, the binder starting materials (e.g., the resole resin 62, the scavenger 64, and optionally any other desired binder ingredients) are mixed together in a mixing pipe or chamber 66 that includes one or more "in-line" or mixer elements 68 (e.g., baffles, agitators, etc.). The mixing pipe or chamber 66 thoroughly mixes the binder ingredients as they pass through to thereby produce the binder composition. If desired, the binder outlet 70 of the mixing pipe or chamber 66 may be directly connected to the glass fiber forming chamber (e.g., via spray application device 20 of FIG. 1) so that the binder can be applied to newly formed glass fibers immediately after the glass fibers are formed and the binder exits the mixing pipe or chamber 66. As another exemplary option, binder outlet 70 may supply binder to a supply tank or system that supplies binder to sprayer 20.

Of course, many other methods and systems for thoroughly mixing the binder ingredients (continuously or otherwise) and applying them to the glass fibers can be used without departing from the invention.

Once applied to the glass fiber base material, as generally mentioned above, the binder may be dried (also called "b-staged") to reduce the amount of water present in the product at that time. Drying may be accomplished in any suitable manner, for example, by exposing the fiberglass product to a heat source at a temperature and for a time sufficient to remove the water from the binder but insufficient to fully cure the binder on the fiberglass. Alternatively, if appropriate, drying can occur without external heating by exposing the fiberglass product to ambient conditions or moving air for a sufficient time period. The skilled artisan, using routine experimentation, can readily determine appropriate drying conditions.

If desired, the b-staged product can be stored, during which time it can be shipped or transported to another location (e.g., the location where it will eventually be used or incorporated into another product). In its uncured state, the b-staged product can be stored for at least one day, preferably at least one week, and advantageously, for at least one month or at least two months or more.

After this optional storage period, the fiberglass product can be further shaped and sized to a desired final shape and size (if necessary). Of course, the glass fiber base material can be formed into the desired final shape and size prior to binder application, if desired, or shaping and sizing can take place before the binder is dried and/or before the binder-coated glass fiber material is stored and/or while the binder-coated glass fiber material is being cured. In this specification, the terms "shaped," "shaping," and "shape" are used generally and generically to include any suitable activities that transform the glass fiber material into a desired size and shape configuration, such as cutting, bending, molding, or the like.

Once in the desired final shape or placed in a mold for shaping, the binder-coated glass fiber material may be cured under suitable curing conditions for the binder (converting the binder from b-stage to c-stage). Typically, in the binders according to some examples of the invention, curing may occur at 150–300° C. for a suitable time period, e.g., 0.5 minutes to 1 hour, preferably less than 10 minutes, and advantageously less than 5 minutes. Curing a binder on a fiberglass product of this type is conventional and well known to those of ordinary skill in the art. The skilled artisan, using routine experimentation, can readily determine appropriate molding and/or curing conditions. Drying, shaping, and/or curing may occur in stages, simultaneously, or in any appropriate manner or order without departing from this invention.

Advantageously, the trimethylamine content of the finished, cured fiberglass products according to at least some examples of the invention will be as low as possible, to help minimize TMA released from the product after final product installation and the resulting odor (TMA emissions from fiberglass products are often associated with a "fishy" smell). In some specific examples, when used in producing fiberglass insulation, the finished fiberglass product will release 25 ppm TMA or less when cured for one minute at 525° F. (274° C.) or 10 ppm or less TMA when cured for ten minutes at 450° F. (232° C.). The procedure for making the TMA emission measurements is described in more detail in the examples below.

IV. EXAMPLES

The invention will now be described in conjunction with various specific examples. These examples should be construed as illustrating the invention, not as limiting it.

A. Samples A and B and Comparative Samples 1 and 2

First, two binder preparations exemplifying the invention were prepared (Binder Samples A and B; Note: Binders A and B were identical except that different concentrations of ammonium hydroxide were used). To prepare Binder A, 97 grams of 20 wt. % ammonium sulfate catalyst (in water) and 11.9 grams of 28 wt. % ammonium hydroxide scavenger (in water) were mixed with 196 grams of a starting phenol-formaldehyde resole resin and 362 grams of additional water. The starting phenol-formaldehyde resole resin contained 4.5 wt. % free formaldehyde and 51 wt. % non-volatiles, each based on the total weight of the resin. The combination was mixed well and allowed to react to formulate Binder A, which contained 15 wt. % binder solids (based on a total weight of the binder). No "pre-reaction" of the resole resin was necessary in preparing Binder A.

For Binder B, 19% ammonium hydroxide was used instead of 28% ammonium hydroxide. 97 grams of 20 wt. % ammonium sulfate catalyst (in water) and 17.5 grams of 19 wt. % ammonium hydroxide scavenger (in water) were mixed with 196 grams of the same starting phenol-formaldehyde resole resin as used for Binder A and 356 grams of additional water. The combination was mixed well and allowed to react to formulate Binder B, which contained 15 wt. % binder solids (based on a total weight of the binder). Like Binder A, no "pre-reaction" of the resole resin was necessary in preparing Binder B.

The properties of Binder A were compared against a comparative binder sample made using urea as a formaldehyde scavenger. To produce the comparative binder sample, 137.25 grams of the same starting phenol-formaldehyde resole resin was mixed with 75 grams of 40 wt. % urea (in water). This mixture was allowed to "pre-react" overnight at room temperature. In the resulting "pre-reaction mixture," the percentage of non-volatiles was 47.1 wt. %, based on the total resole resin weight. 212.25 grams of the resulting "pre-reaction mixture" were then mixed with 22.5 grams of 20 wt. % ammonium sulfate (in water) and 6 grams of 28 wt. % ammonium hydroxide (in water) and 425.92 grams of additional water. The resulting combination was mixed well and allowed to react to formulate the phenol-formaldehyde comparative sample binder.

Binder A and the comparative sample binder were applied to separate unbonded glass fiber base materials in a conventional manner, by drawing a fine mist of the binder through glass fiber using suction until sufficient binder had been applied to the glass fiber base material. For each sample, the binder-containing glass fiber base material was then cured under suitable cure conditions.

The cured glass fiber base materials described above were cut into smaller sections sized approximately 1 inch×1 inch×½ inch. 12 grams of the cured glass fiber materials were weighed into cheesecloth to thereby produce four different fiberglass samples each containing 12 grams of fiberglass (two samples from the fiberglass made using Binder A (Sample A #1 and A #2) and two samples from the fiberglass made using the comparative binder sample (Comparative Samples 1 and 2)). For each of these four samples, 10 grams of distilled water was placed in a 1-quart mason jar containing a 50 ml glass beaker. One 12 gram sample of the small fiberglass sections was set on top of the 50 ml glass beaker in each of the mason jars. The mason jars were sealed and incubated in a forced air oven for 16 hours at 65° F. The mason jars were then removed from the oven and allowed to cool to room temperature. The water in each jar was transferred to a separate scintillation vial and analyzed for trimethylamine content using a gas chromatograph-mass spectrometer. The results are set forth in Table 1 below:

TABLE 1

| Fiberglass Sample | TMA Emission Analysis (ppm) | Average TMA Emission (ppm) |
|---|---|---|
| Comparative Sample 1 | 36 ppm | Average TMA emission for the two Comparative Samples: 29 ppm |
| Comparative Sample 2 | 22 ppm | |
| Sample A #1 | 5 ppm | Average TMA emission for the two Samples according to the invention: 4.5 ppm |
| Sample A #2 | 4 ppm | |

Table 1 demonstrates that the fiberglass samples produced in accordance with the invention displayed an improved and reduced TMA emission as compared to the comparative sample fiberglass produced using a phenol-formaldehyde binder "pre-react" with urea as the formaldehyde scavenger.

B. Samples C and D and Comparative Samples 3 and 4

Another binder preparation exemplifying the invention was prepared (Binder Sample C). To prepare Binder Sample C, 431 grams of 20 wt. % ammonium sulfate catalyst (in water) and 47.6 grams of 28 wt. % ammonium hydroxide scavenger (in water) were mixed with 784.3 grams of a starting phenol-formaldehyde resole resin and 1404 grams of additional water. The starting phenol-formaldehyde resole resin contained 51% (by weight) non-volatiles, based on the total weight of the resin. The combination was mixed well and allowed to react to formulate Binder Sample C, which contained 15 wt. % binder solids (based on a total weight of the binder). No "pre-reaction" of the resole resin was necessary in preparing Binder Sample C.

The properties of Binder Sample C were compared against a comparative binder sample made using urea as a formaldehyde scavenger. To produce the comparative binder sample, 706 grams of the same starting phenol-formaldehyde resole resin as used in Binder Sample C was mixed with 100 grams of 40 wt. % urea (in water). This mixture was allowed to "pre-react" overnight at room temperature. In the resulting "pre-reaction mixture," the molar ratio of formaldehyde to urea was 1.59, and the percentage of non-volatiles was 49.6% (by weight, based on the total resole resin weight). 806 grams of the resulting "pre-reaction mixture" were then mixed with 388 grams of 20 wt. % ammonium sulfate (in water), 14 grams of 28 wt. % ammonium hydroxide (in water, for pH control), and 1459 grams of additional water. The resulting combination was mixed well and allowed to react to formulate Comparative Binder Sample 3. Comparative Binder Sample 3 had 15 wt. % binder solids (based on a total weight of the binder).

Binder Sample C and Comparative Binder Sample 3 were applied to separate unbonded glass fiber base materials (B-010 fiberglass) in a conventional manner, by drawing a fine mist of each binder through the glass fibers using suction until approximately 4–5 grams of binder had been applied to the glass fiber base material. For each sample, the binder-containing glass fiber base material was then cured at 525° F. in a steel mold set to ½ inch thickness for 1 minute.

The cured glass fiber base materials described above were cut into smaller sections sized approximately 1 inch×1 inch×½ inch. 12 grams of the cured glass fiber materials were weighed into cheesecloth to thereby produce four different samples each containing 12 grams of fiberglass (two fiberglass samples from Binder Sample C (Fiberglass Samples C and D) and two fiberglass samples from Comparative Binder Sample 3 (Comparative Fiberglass Samples 3 and 4)). For each of these four samples, 10 grams of distilled water was placed in a 1-quart mason jar containing a 50 ml glass beaker. One 12 gram sample of the small fiberglass sections was set on top of the 50 ml glass beaker in each of the mason jars. The mason jars were sealed and incubated in a forced air oven for 16 hours at 65° F. The mason jars were then removed from the oven and allowed to cool to room temperature. The water in each jar was transferred to a separate scintillation vial and analyzed for trimethylamine content using a gas chromatograph-mass spectrometer. The results are set forth in Table 2 below:

TABLE 2

| Fiberglass Sample | TMA Emission Analysis (ppm) | Average TMA Emission (ppm) |
| --- | --- | --- |
| Comparative Sample 3 | 17 ppm | Average TMA emission for the two Comparative Samples: 19.5 ppm |
| Comparative Sample 4 | 22 ppm | |
| Sample C | 10 ppm | Average TMA emission for the two Samples according to the invention: 10 ppm |
| Sample D | 10 ppm | |

Table 2 demonstrates that the samples produced in accordance with the invention display an improved and reduced TMA emission as compared to the comparative sample fiberglass produced using a phenol-formaldehyde binder "pre-react" with urea as the formaldehyde scavenger.

Binders according to examples of the invention and products produced using these binders may display various advantages, e.g., water solubility, low molecular weight, and low TMA emissions. Thus, the binders and other products according to examples of the invention may exhibit various advantages associated with these characteristics, such as less stickiness, lower tetradimer content, less precipitation, no "fishy" odor, etc.

Also, use of binders according to some examples of the invention may increase flexibility for fiberglass manufacturers. Typically, a fiberglass manufacturer produces many different products at one facility. For some of these products, such as home insulation, the trimethylamine content in the product is not important because the final product ultimately will be enclosed in a vapor barrier inside a wall. Other products, however, are sold into more sensitive markets where trimethylamine emissions will not be tolerated (e.g., room dividers, automobile headliners, etc.). While fiberglass manufacturers may make these different products using different binders (e.g., one low TMA binder and one non-low TMA binder), this requires more expertise and increases handling difficulties. One advantage of using the binders according to some examples of the invention relates to the ability for fiberglass manufacturers to use one binder to serve both the TMA sensitive and insensitive markets.

While the invention has been described in terms of various specific examples, these specific examples merely exemplify the invention and do not limit it. Those skilled in the art will appreciate that changes and modifications may be made to these examples without departing from the spirit and scope of the invention, as defined in the appended claims.

We claim:

1. A method comprising:
    combining a phenol-formaldehyde resole resin and an ammonia-based formaldehyde scavenger to form a mixture, wherein the resin has a free formaldehyde content of 1.5 to 14%, by weight, based on a total weight of the resin, wherein the mixture contains 5% urea, by weight, or less, based on a total weight of the mixture, and wherein the resin and the scavenger are combined in amounts such that a molar ratio of the free formaldehyde to ammonia from the ammonia-based formaldehyde scavenger is in a range of 0.1 to 5; and
    reacting the free formaldehyde and the scavenger to thereby form a formaldehyde-scavenged product, wherein the formaldehyde-scavenged product has a free formaldehyde content of 1% or less, by weight, based on a total weight of the formaldehyde-scavenged product, and wherein the formaldehyde-scavenged product has a water dilutability of 50:1 or higher.

2. A method according to claim 1, wherein the ammonia-based formaldehyde scavenger includes a member selected from the group consisting of anhydrous ammonia and aqueous ammonium hydroxide.

3. A method according to claim 1, further comprising:
    combining water with the phenol-formaldehyde resole resin and the ammonia-based formaldehyde scavenger.

4. A method according to claim 1, further comprising:
    combining a latent acid catalyst with the phenol-formaldehyde resole resin and the ammonia-based formaldehyde scavenger.

5. A method according to claim 4, wherein the latent acid catalyst includes at least one member selected from the group consisting of an ammonium salt of sulfuric acid, an ammonium salt of oxalic acid, and an ammonium salt of a sulfonic acid.

6. A method according to claim 1, wherein the molar ratio is in a range of 0.5 to 2.

7. A method according to claim 1, wherein the phenol-formaldehyde resole resin has a weight average molecular weight of 800 or less.

8. A method according to claim 1, further comprising:
    applying the formaldehyde-scavenged product to a glass fiber base material.

9. A method according to claim 8, wherein the formaldehyde-scavenged product is applied to the glass fiber base material less than 5 minutes after the free formaldehyde and the ammonia-based formaldehyde scavenger are reacted to form the formaldehyde-scavenged product.

10. A glass fiber material prepared by the method of claim 8.

11. A method according to claim 1, wherein the free formaldehyde content of the resole resin is in the range of 3 to 14%, by weight, based on the total weight of the resole resin.

12. A reaction product prepared by the method of claim 1.

13. A method for preparing a glass fiber product, comprising:
    preparing a binder including a phenol-formaldehyde resole resin and an ammonia-based formaldehyde scavenger, wherein the resin has a free formaldehyde content of 1.5 to 14%, by weight, based on a total weight of the resin, wherein the resin and the scavenger are present in amounts such that a molar ratio of the free formaldehyde to ammonia from the ammonia-based formaldehyde scavenger is in a range of 0.1 to 5, wherein the binder has a final free formaldehyde content of 1% or less, by weight, based on a total weight of the binder, and wherein the binder has a water dilutability of 50:1 or higher; and applying the binder to a glass fiber base material to thereby produce a glass fiber product, wherein the preparing and applying steps occur in an in-line manner.

14. A method according to claim 13, further comprising:

drying the binder on the glass fiber base material.

15. A method according to claim 13, further comprising:

forming the glass fiber base material to a predetermined size or shape after the binder is applied to the glass fiber base material.

16. A method according to claim 13, wherein the ammonia-based formaldehyde scavenger includes a member selected from the group consisting of anhydrous ammonia and aqueous ammonium hydroxide.

17. A method according to claim 13, further comprising:

mixing a latent acid catalyst with the phenol-formaldehyde resole resin and the ammonia-based formaldehyde scavenger.

18. A method according to claim 13, wherein the molar ratio is in a range of 0.5 to 2.

19. A method according to claim 13, wherein the binder contains 5 wt. % urea or less.

20. A method according to claim 13, wherein the free formaldehyde content of the resole resin is in the range of 3 to 14%, by weight, based on the total weight of the resin.

21. A method according to claim 13, further comprising:

curing the binder on the glass fiber base material.

22. A glass fiber product prepared by the method of claim 21.

23. A glass fiber product according to claim 22, wherein the glass fiber product releases 25 ppm trimethylamine or less when cured for 1 minute at 525° F.

24. A glass fiber product according to claim 22, wherein the glass fiber product releases 10 ppm trimethylamine or less when cured for 10 minutes at 450° F.

25. A method for preparing a glass fiber product, comprising:

preparing a binder including a phenol-formaldehyde resole resin and an ammonia-based formaldehyde scavenger, wherein the resin has a free formaldehyde content of 1.5 to 14%, by weight, based on a total weight of the resin, wherein the resin and the scavenger are present in amounts such that a molar ratio of the free formaldehyde to ammonia from the ammonia-based formaldehyde scavenger is in a range of 0.1 to 5, wherein the binder has a final free formaldehyde content of 1% or less, by weight, based on a total weight of the binder, and wherein the binder has a water dilutability of 50:1 or higher; and applying the binder to a glass fiber base material to thereby produce a glass fiber product, wherein the applying step occurs within one hour of the preparing step.

26. A method according to claim 25, further comprising:

drying the binder on the glass fiber base material.

27. A method according to claim 25, further comprising:

forming the glass fiber base material to a predetermined size or shape after the binder is applied to the glass fiber base material.

28. A method according to claim 25, wherein the ammonia-based formaldehyde scavenger includes a member selected from the group consisting of anhydrous ammonia and aqueous ammonium hydroxide.

29. A method according to claim 25, further comprising:

mixing a latent acid catalyst with the phenol-formaldehyde resole resin and the ammonia-based formaldehyde scavenger.

30. A method according to claim 25, wherein the molar ratio is in a range of 0.5 to 2.

31. A method according to claim 25, wherein the binder contains 5 wt. % urea or less.

32. A method according to claim 25, wherein the free formaldehyde content of the resole resin is in the range of 3 to 14%, by weight, based on the total weight of the resin.

33. A method according to claim 25, further comprising:

curing the binder on the glass fiber base material.

34. A glass fiber product prepared by the method of claim 33.

35. A glass fiber product according to claim 34, wherein the glass fiber product releases 25 ppm trimethylamine or less when cured for 1 minute at 525° F.

36. A glass fiber product according to claim 34, wherein the glass fiber product releases 10 ppm trimethylamine or less when cured for 10 minutes at 450° F.

* * * * *